United States Patent [19]
de la Haye

[11] 4,400,003
[45] Aug. 23, 1983

[54] DEMOUNTABLE BICYCLE FRAME

[75] Inventor: Cornelis F. de la Haye, TM Katwijk aan Zee, Netherlands

[73] Assignee: Technic Design One N.V., Curacao, Netherlands Antilles

[21] Appl. No.: 236,228

[22] Filed: Feb. 20, 1981

[30] Foreign Application Priority Data

Feb. 21, 1980 [NL] Netherlands ............... 8001054

[51] Int. Cl.³ .................................... B62K 15/00
[52] U.S. Cl. ........................ 280/278; 280/281 R; 280/287
[58] Field of Search ............... 280/278, 287, 281

[56] References Cited

U.S. PATENT DOCUMENTS 3,448,997  6/1969  Kosugi ..................... 280/287
3,990,717  11/1976  Best ........................ 280/278
4,202,561  6/1978  Yonkers ................... 280/278

Primary Examiner—Joseph F. Peters, Jr.
Assistant Examiner—Donn McGiehan
Attorney, Agent, or Firm—Murray Schaffer

[57] ABSTRACT

A bicycle frame, having the usual front fork, back fork, steering head sleeve and pedal shaft sleeve has an oblique tube, extending towards the steering head sleeve, which is pivotably connected to the back fork and is substantially in alignment with the back fork. A bar extends from the pivot point towards a saddle support means, and a bar extends towards the pedal shaft sleeve. The bars are substantially in alignment and are being connected to the back fork and to the steering head sleeve by tensioning wires, by demountable and releasable insert and wiring connections.

6 Claims, 6 Drawing Figures

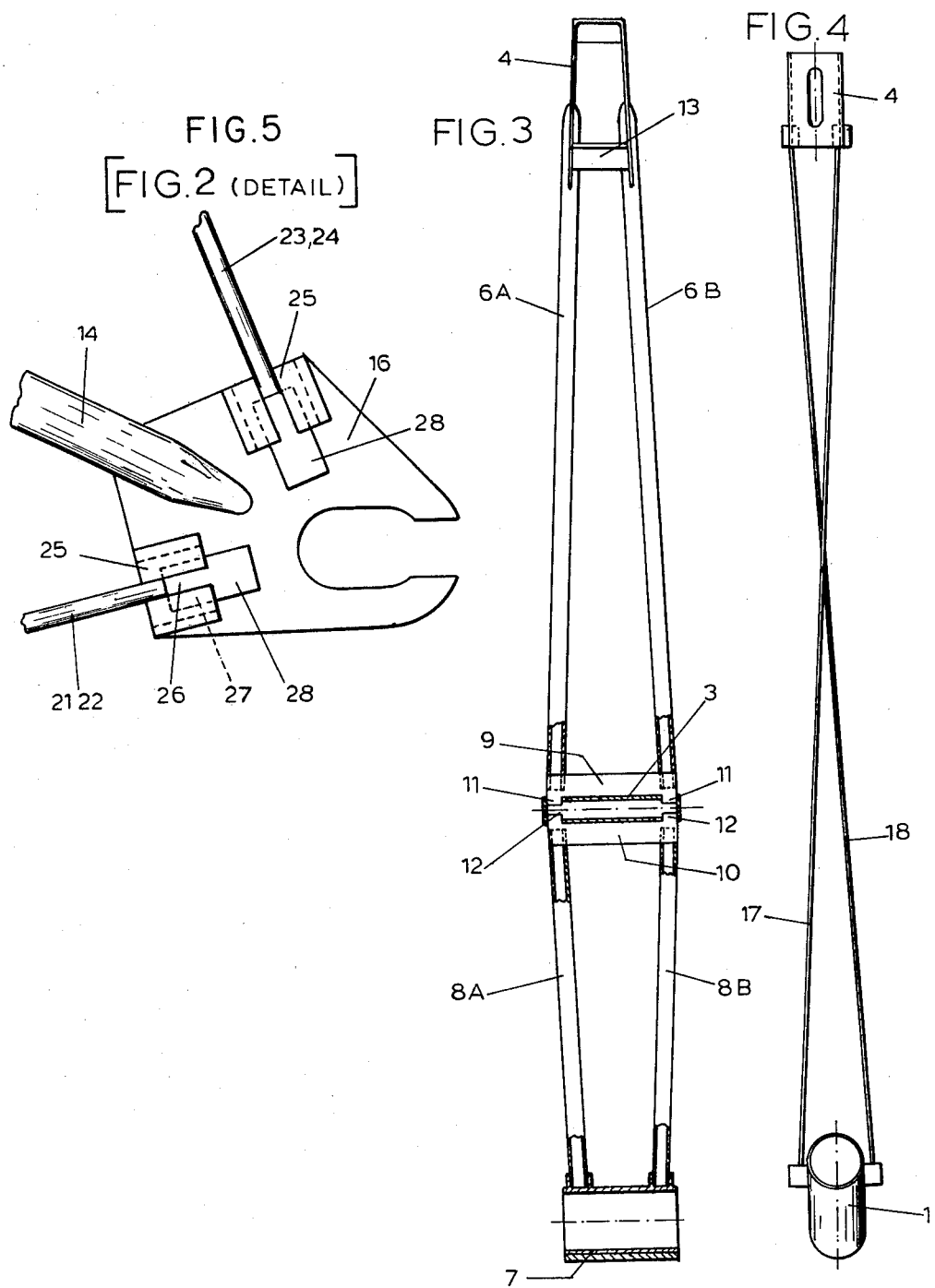

DEMOUNTABLE BICYCLE FRAME

BACKGROUND OF THE INVENTION

The invention relates to a bicycle frame having a front fork, a back fork, a steering head sleeve and a pedal shaft sleeve.

Such a frame is generally known. The known frame comprises tubes which are mutually secured, mainly into triangles, by means of so called lugs (insert sleeves). In order to guarantee sufficient rigidity and strength against compression, flexing and torsional forces, which act in combination, this frame has to be manufactured of relatively thick and therefore heavy material.

The invention aims at obtaining a decrease of the weight and simultaneously a more rigid frame.

SUMMARY OF THE INVENTION

This is achieved according to the invention in that an oblique tube extending to the steering head sleeve is pivotably joined to the back fork and extends substantially in alignment with the back fork, while a bar extends from the pivot point towards a saddle support means and a bar extends towards the pedal shaft sleeve. The bars likewise are substantially in mutual alignment, and their free ends are connected to the free end of the back fork and to the steering head sleeve through tensioning wires.

In that the tensioning wires impart a biasing load to the frame, compression forces are supported by the frame with hardly any flexing forces. The diagonals of the polygon mainly formed by the tensioning wires may be manufactured from material having much less weight. The torsional forces are received mainly by the tensioning wires.

In one embodiment according to the invention the bar extending towards the saddle support means and the bar extending towards the pedal shaft sleeve may be rods, which are pivotably mutually connected and pivotably connected to the pivot point.

In another embodiment according to the invention the bars may constitute one continuous integral rod.

A further substantial advantage of the new frame is that it may be made easily demountable. This is achieved when the pivot connections are easily releasable insert connections.

After releasing the tensioning wires, which e.g. may be connected to the tubes and rods by means of hook-in connections, the pivot connections may be released, whereby the diagonals become available in three or four pieces. The longest piece then is the continuous tube or rod between the saddle and the pedal shaft sleeve or, if this tube has a pivot between the ends, the oblique tube, this largest length being substantially equal to the diameter of the wheels. The bicycle now may be packed in demounted condition in a suitcase or box, the dimensions of which correspond to those of one wheel. Transport and storage for the factory, as well as for the bicycle dealer and the user, are thereby greatly facilitated and much cheaper. Assembling and demounting may be made so simple that the user easily can carry his bicycle in his car or on public transport service. The construction of the present invention, contrary to the so-called conventional folding bicycle, permits the erection of a standard bicycle, having standard wheel diameter. Preferably the tensioning wires are provided in twin couples so that the rigidity of the frame against the torsional forces perpendicular to the frame plane is increased.

The torsional rigidity is further increased when the tensioning wires of a couple cross over each other.

For tensioning the tensioning wires, a tensioning device may be provided at the end of each thereof, e.g. in the shape of a so-called turnbuckle.

It is sufficient and with respect to mounting and demounting and to the manufacturing costs preferably to provide only one of the tensioning wires or couples of tensioning wires with a tensioning device.

Preferably the tensioning device comprises a rotary handle, cooperating with a cam profile or a cam follower means respectively.

It is also possible to provide the tensioning device in the pivot point.

The invention will hereunder be illustrated with reference to the drawing in which an embodiment as an example of the bicycle frame according to the invention is shown.

BRIEF DESCRIPTION OF THE DRAWINGS

In the drawings

FIG. 3 is a back view of the frame bars extending from the pivot point, FIG. 4 is a plan view of the upper tensioning wires, FIG. 5 is an enlarged detail view of the back fork plate and the elements secured thereto.

DESCRIPTION OF THE INVENTION

Figure 1:
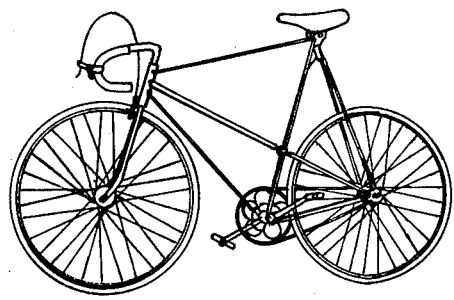
FIG. 1 is a side view of a bicycle having the frame according to the present invention.
Figure 2:
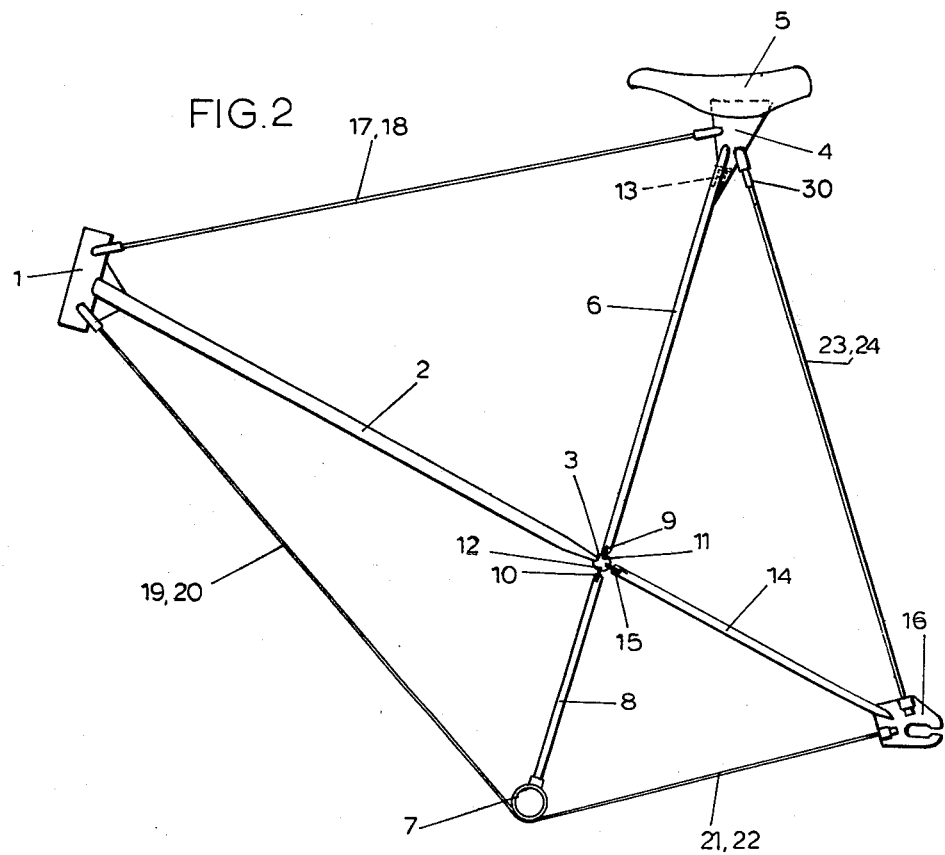
FIG. 2 is a side view on an enlarged scale of the frame without the front fork.

The frame as shown from the side view of FIG. 1 comprises a steering head sleeve 1, which is secured to or integral with an oblique tube 2 extending from said steering head sleeve downwardly and rearwardly. In the embodiment shown a transverse hub sleeve 3 is secured to the free end of the oblique tube 2 perpendicular to its longitudinal direction, the free end being somewhat flattened at that position. A seat support comprising a support rod 6 extends upwardly from the hub sleeve 3 toward a saddle support bracket 4 to which a pin (not shown) for securing a saddle 5 is connected. Likewise, extending downwardly from the transverse sleeve 3 is a pedal support bar 8 to which is secured a pedal shaft sleeve 7.

As appears from FIG. 3 the bars 6 and 8 have been doubled, i.e. the bar 6 comprises two rods or thin tubes 6A, 6B, extending somewhat convergingly from the sleeve 3, which are mutually secured at their ends adjacent the hub sleeve 3 by means of a transverse plate 9 and at their ends adjacent the saddle bracket 4 by means of a transverse plate 13.

The plates 9 and 10 respectively extend in the longitudinal direction of the sleeve 3 and engage within corresponding slots 11, 12 formed in the sleeve 3 extending in the longitudinal direction of the sleeve 3.

A back fork 14 extends from the transverse hub sleeve 3 substantially in axial alignment with the oblique tube 2, the back fork 14 likewise comprises two rods or thin tubes 14A, 14B which are mutually secured to the hub sleeve 3 by means of a transverse plate 15. The rods 14A and 14B extend divergingly from the hub sleeve 3 and each secured at their free ends to a vertical plate 16 for mounting the axle of the rear wheel.

Figure 6:
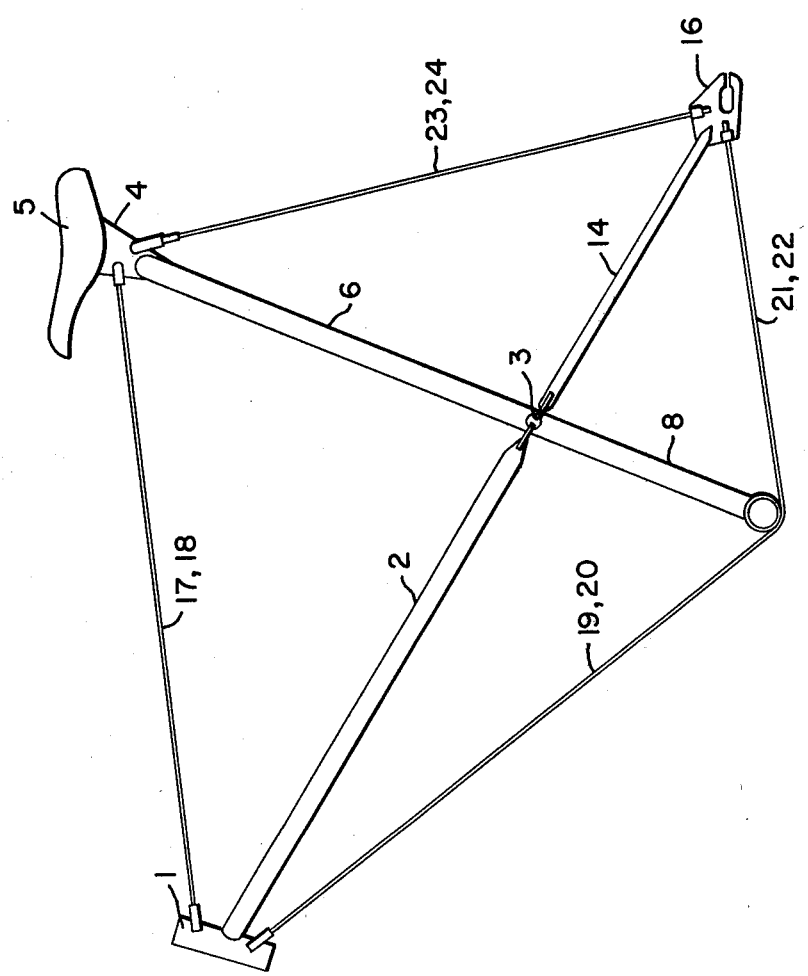
FIG. 6 is a view similar to FIG. 2 showing another embodiment of the invention.

As appears from the drawing also, the rods 6 and 8 are substantially in mutual alignment. As seen in FIG. 6 the rods 6 and 8 (i.e. 6A, 6B and 8A, 8B) may constitute a continuous integral rod, with the hub sleeve 3 secured therebetween as by welding. Also, in this embodiment both the oblique tube 2 and the back fork tube 14 must be secured to the hub sleeve 3, by plates and slots as were rods 6 and 8 in the embodiment of FIG. 3.

Returning to FIG. 3, through the connections between the plates 9, 10 and 15 with the slots in the transverse hub sleeve 3 a certain pivotal movement is permitted between the rods 6, 8 and the fork 14 on the one hand and the hub sleeve 3 on the other hand. The rigidity of the frame is obtained by peripheral tensioning wires which, in the embodiment shown, are always provided in sets of two wires each. The steering head sleeve 1 is connected to the saddle support bracket 4 by paired tensioning wires 17, 18 which cross over each other as appears from FIG. 4. The steering head sleeve 1 is also connected to the pedal shaft sleeve 7 by two crossed tensioning wires 19, 20, while the pedal shaft sleeve 7 is connected to the vertical plate 16 by two tensioning wires 21, 22 which, because of the presence of the backwheel of the bicycle do not cross each other. Finally the plate 16 is connected to the saddle attachment bracket 4 by two tensioning wires 23, 24 which may be substantially parallel but may also cross each other provided care is taken that the crossing point does not hinder the presence of the bicycle backwheel.

The connection of the ends of the tension wires to the respective sleeves and plates may be a hook-in-connection as is shown for example in FIG. 5, where the ends of the wires 21, 22 which are connected to the plate 16 by a small block 25 has been secured to the plate 16. The block has a slot 26 extending in the longitudinal direction of the wire 21, 22 and being open at the side remote from the plate 16. The slot has a widened portion 27 at one end into which fits a smaller block 28 connected integrally to the end of the tensioning wire through welding soldering or in another suitable manner. The tensioning wire may thereby be placed into the slot 26 from the lateral side, whereby the block 28 is received in the widened portion 27. Through tensioning the tensioning wire a rigid connection is obtained in that the block 28 is drawn against the end of the widened portion. All ends of all tensioning wires may be secured in this manner.

It is possible to provide a so called turnbuckle 30 in each tensioning wire but preferably a tensioning device is only provided in each of tensioning in wires 23, 24 extending from the plate 16 towards the saddle support bracket 4. To provide a quick assembling and demounting of the bicycle it may be preferable to replace the turnbuckles by a rotary locking connection (not shown). Known devices of this type comprise a handle, connected to a cam profile which is rotatable with respect to a corresponding surface of a part connected to one the tensioning wire ends. The cam profile of the handle is connected to the end of the other tensioning wire.

The tensioning wires may be manufactured from steel, but may also be made from so called carbon fibres. The further frame parts likewise may be made of steel, synthetic material or other metals or combinations thereof.

I claim:

1. A bicycle frame comprising a back fork, a steering head sleeve, a pedal shaft sleeve, a saddle support, continuous bar means extending from said saddle support to said pedal shaft sleeve, pivot means located intermediate the end of said continuous bar means, an oblique tube extending from the steering head sleeve to said pivot means substantially in alignment with the back fork, said back fork extending to said pivot means, and tensioning wires peripherally connecting the ends of said continuous bar means, the back fork and the steering head sleeve, said pivot means and the ends of each said oblique tube and back fork comprising demountable connection means consisting of male and female members, disengageable upon release of tension in the tensioning wires.

2. A bicycle frame comprising a back fork, a steering head sleeve, a pedal shaft sleeve, a saddle support, an oblique tube extending from the steering head sleeve in substantial alignment with the back fork, pivot means interposed between the oblique tube and the back fork, so that said oblique tube is pivotably connected to said back fork, first bar means extending from the saddle support means to the pivot means and second bar means extending from the pedal shaft sleeve to the pivot means, said first and second bar means being substantially in alignment with each other and being pivotably connected to each other, tensioning wires connecting both said first and second bar means to the back fork and to the steering head sleeve, said pivot means comprising insert connection means consisting of male and female members disengageable upon release of the tension of the tensioning wires 3. A bicycle frame comprising a first tubular member having a steering head mounted at one end, a second tubular member forming a back fork, a third tubular member having a saddle seat bracket mounted at one end, and a fourth tubular member having a pedal shaft sleeve mounted at one end, a demountable joint means for releasably interconnecting the free ends of said tubular members about a common point and tensioning wires peripherally connecting said tubular members to form a polygon wherein said tubular members are placed under compression about said point and form rigid diagonals of said polygon, said demountable joint means being disconnectable on release of tension in said tension wires.

4. The bicycle frame according to claim 3 wherein the demountable joint means comprises a hub integrally secured to at least one of said tubular members, said hub and the remaining ones of said tubular members having cooperable insert and receiving means for releasably connecting said tubular members to said hub.

5. The bicycle frame according to claim 4 wherein said hub comprises a tubular sleeve having a plurality of longitudinal slots and said remaining tubular members have integral plates at their free ends each slidably insertable in a selected one of said slots.

6. The bicycle frame according to claims 2 or 3 wherein said third and fourth tubular members are joined to form a continuous rod member and said hub is integrally secured to said rod member at the juncture of said tubular member.

* * * * *